United States Patent
Evans, Jr. et al.

[11] Patent Number: 5,947,001
[45] Date of Patent: Sep. 7, 1999

[54] MOLDED PISTON

[75] Inventors: Charles F. Evans, Jr.; Edwin P. Wnorowski; Robert R. Fowler, all of Louisville, Ky.; Brian P. Pate, Salem, Ind.

[73] Assignee: Turn-Act, Inc., Louisville, Ky.

[21] Appl. No.: 08/847,394

[22] Filed: Apr. 24, 1997

[51] Int. Cl.[6] .................................................. F01B 25/26
[52] U.S. Cl. ............................. 92/5 R; 92/243; 92/248; 91/1
[58] Field of Search .............................. 92/5 R, 240, 242, 92/243, 248; 91/1

[56] References Cited

U.S. PATENT DOCUMENTS

| | | |
|---|---|---|
| 1,028,426 | 6/1912 | Braymer . |
| 2,309,446 | 1/1943 | Ekkebus ............................... 92/243 X |
| 2,309,466 | 8/1943 | Martin . |
| 2,386,668 | 7/1945 | Douglas et al. . |
| 2,984,529 | 5/1961 | Dailey ................................... 92/243 X |
| 3,319,537 | 5/1967 | Pittman ................................. 92/243 X |
| 3,354,794 | 11/1967 | Dailey ....................................... 92/243 |
| 3,440,930 | 4/1969 | Olson . |
| 3,465,650 | 9/1969 | Gluck . |
| 3,703,125 | 11/1972 | Paulikonis . |
| 3,808,956 | 5/1974 | Knapp . |
| 3,913,460 | 10/1975 | Wright . |
| 4,214,507 | 7/1980 | Hock et al. ........................... 92/243 X |
| 4,281,590 | 8/1981 | Weaver . |
| 4,294,164 | 10/1981 | Stoll ......................................... 92/243 |
| 4,449,447 | 5/1984 | Yanagi . |
| 4,651,623 | 3/1987 | Rogers . |
| 4,793,241 | 12/1988 | Mano et al. ............................. 92/5 R |
| 4,813,343 | 3/1989 | Schaefer ................................... 92/243 |
| 4,876,531 | 10/1989 | Dondorf . |
| 4,896,584 | 1/1990 | Stoll et al. . |
| 4,973,027 | 11/1990 | Casas . |
| 4,982,652 | 1/1991 | Blatt ......................................... 92/5 R |
| 5,150,049 | 9/1992 | Schuetz ..................................... 92/5 R |
| 5,224,413 | 7/1993 | Henner . |
| 5,353,689 | 10/1994 | Bolt et al. . |

FOREIGN PATENT DOCUMENTS

| | | | |
|---|---|---|---|
| 004122481 | 1/1993 | Germany ................................... 92/5 R |

*Primary Examiner*—Hoang Nguyen
*Attorney, Agent, or Firm*—Theresa Camoriano; Wheat Camoriano Smith & Beres PLC

[57] ABSTRACT

A molded piston includes a base plate, having a plurality of holes, and a polymeric material molded around the base plate and extending through the holes so as to form a mechanical bond between the base plate and the polymeric material. The molded piston preferably includes integral seals in its outer circumferential surface and integral standoffs on its end surfaces. In some preferred embodiments, the molded piston also includes a magnet which creates a magnetic field in the area of the piston.

8 Claims, 3 Drawing Sheets

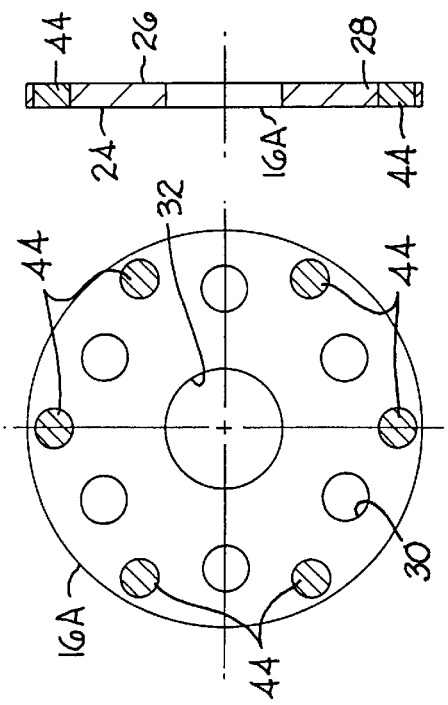
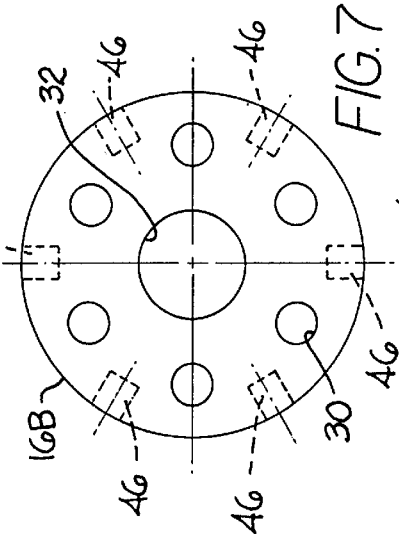
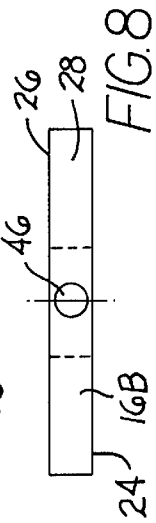
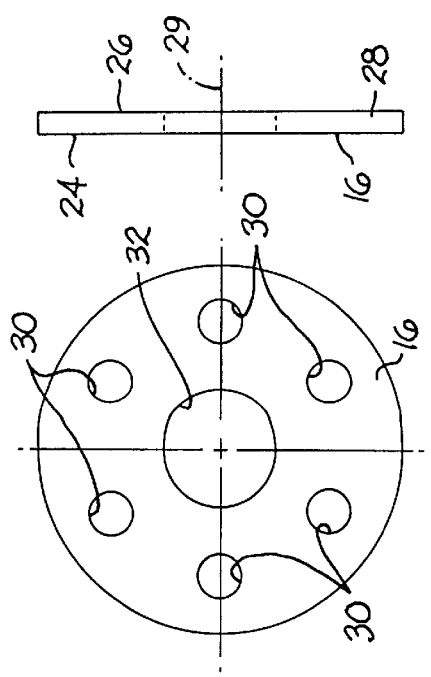
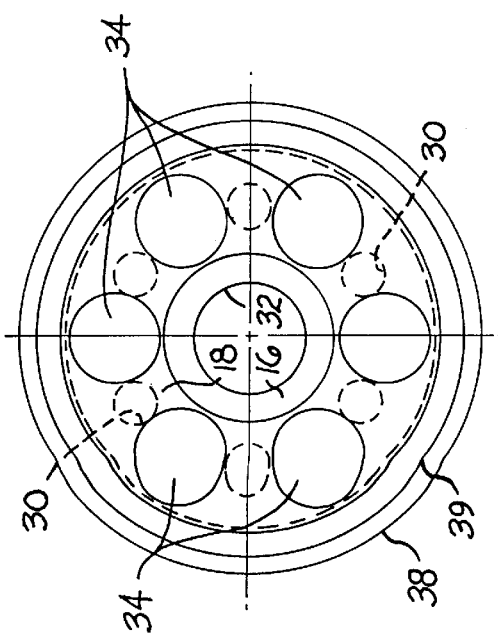

MOLDED PISTON

BACKGROUND OF THE INVENTION

The present invention relates to pistons and, in particular, to a molded piston.

Piston-cylinder assemblies are used in a wide array of industrial applications. Although high-speed and high-temperature applications often require metal pistons, plastic composites are preferred in lighter duty applications such as pneumatic actuators; however, prior art plastic composite pistons have had many problems.

Generally, in the prior art, plastic pistons are molded by bonding a polymeric compound to a metal plate; however, the bonds between the polymer and the metal plate tend to fail during operation of these pistons, making them impractical for most uses.

In the prior art, rubber seals are usually installed on the piston to provide a seal against the cylinder wall. These seals create substantial friction and tend to fail rapidly, particularly when contaminants are present in the cylinder.

Further problems common in prior art piston-cylinder assemblies are the noise and vibrations produced by the impact of the piston against the cylinder head. Also, the repeated shock of the impact of the piston against the cylinder head often causes failure of associated components of the assembly. Prior art devices have attempted to minimize these problems by using an air cushion or similar devices, but these methods often require expensive additional equipment and create additional problems.

SUMMARY OF THE INVENTION

The present invention provides a molded piston that overcomes the problems of separation and joint failure in the prior art. The present invention provides channels, or holes, through the base plate through which the polymeric material flows during the molding process, forming columns of polymer extending completely through the base plate. The base plate is encased in the polymeric material, and, as the polymer sets, the polymeric material becomes a unitary mass with a mechanical bond to the base plate. The polymer and base plate then function as a single unit.

The preferred embodiment of the present invention provides seals as an integral part of the molded piston body. This permits the seals to have a sharper surface in contact with the cylinder, thereby reducing friction, and eliminating the need for separate seals.

The present invention also solves the problems of excessive noise and vibrations. The preferred embodiment of the present invention has a series of raised, radially-arrayed "bumps" or "stand-offs" on the end surfaces of the piston that contact the cylinder head. These stand-offs are formed during the molding process and help absorb the impact resulting from the piston striking the cylinder head. The flexibility of the polymer, as compared to a metal or steel alloy, allows for compression and absorption of the impact. This method of reducing noise and impact is much less expensive and more reliable than prior art methods.

The stand-offs of the present invention also will allow air to reach more of the end surfaces of the piston. If the piston is flush against the cylinder head, greater operating pressures are needed to actuate the piston, because the surface area over which the operating pressure acts is minimal. The stand-offs prevent the piston from resting flush against the cylinder head, thus increasing the surface area over which the operating pressure acts, and decreasing the likelihood of the piston locking up.

Another feature in some embodiments of the present invention is the incorporation of a magnetic assembly in the molded piston that allows for detection of the piston's location within the cylinder.

BRIEF DESCRIPTION OF THE DRAWINGS

FIG. 2 is an end view of the base plate of the piston of FIG. 1;

FIG. 3 is a side view of the base plate of FIG. 2;

FIG. 4 is an end view of the piston of FIG. 1;

FIG. 5 is an end view of a second embodiment of a piston base plate made in accordance with the present invention;

FIG. 6 is a side sectional view of the base plate of FIG. 5;

FIG. 7 is an end view of a third embodiment of a base plate made in accordance with the present invention;

FIG. 8 is a top plan view of the piston base plate of FIG. 7; and

DESCRIPTION OF THE PREFERRED EMBODIMENTS

Figure 1:
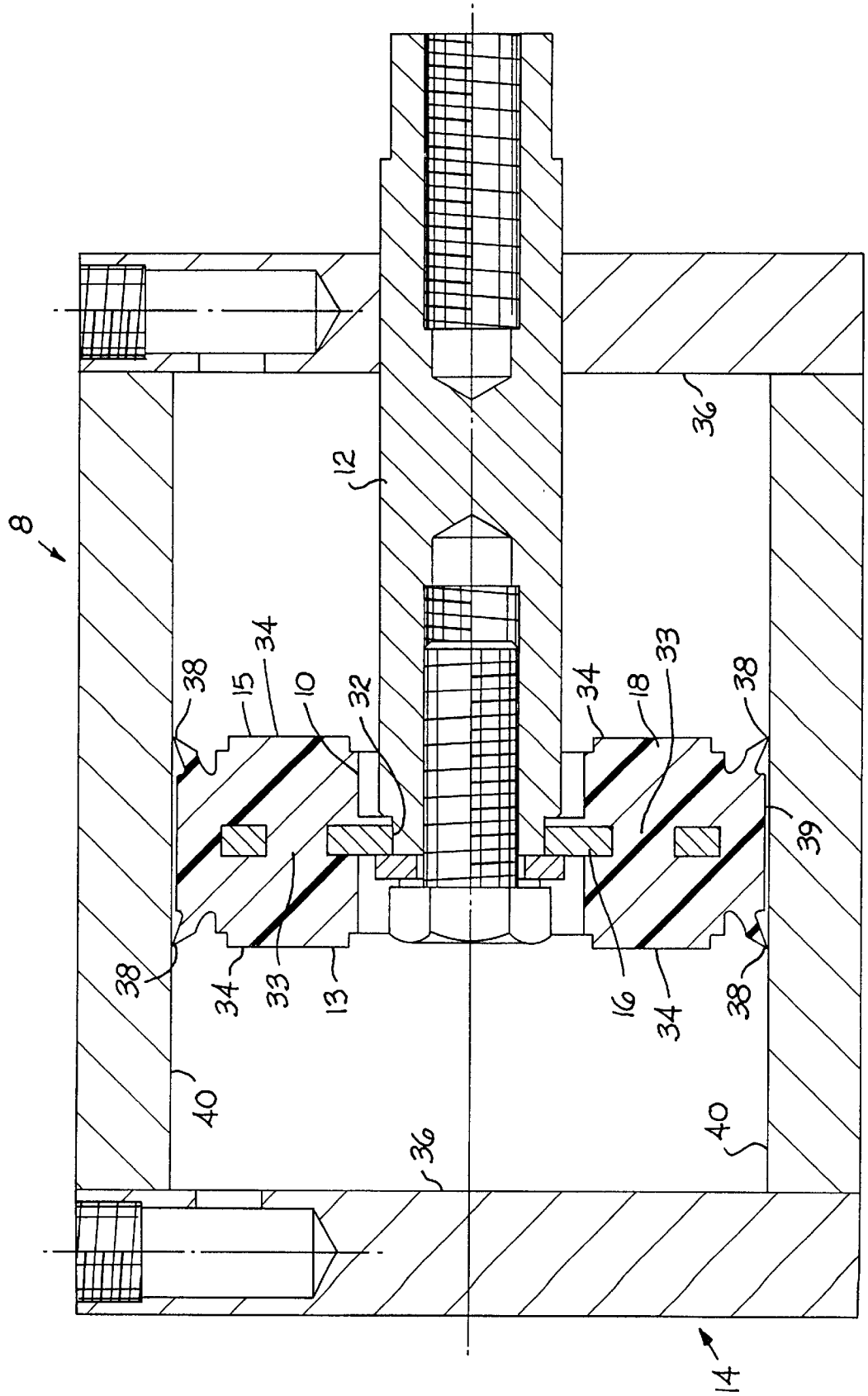
FIG. 1 is a sectional side view of an embodiment of a piston-cylinder assembly, made in accordance with the present invention.

FIG. 1 shows a first embodiment of a piston-cylinder assembly 8 made in accordance with the present invention. The piston 10 is bolted to a piston rod 12 and is located inside cylinder 14, dividing the cylinder into left and right chambers. Fluid in the cylinder chambers exerts pressure on the end surfaces 13, 15 of the piston 10, driving the piston 10 back and forth in the cylinder 14.

The piston 10 includes a base plate 16 that is encased in a polymeric material 18. The base plate 16 is shown in FIGS. 2 and 3. In this preferred embodiment, the base plate 16 is a thin annular washer, or disk, having first and second faces 24 and 26, a cylindrical outer edge 28, and an axis of rotation 29. A central hole 32 through the washer 16 permits the piston 10 to be connected to the piston rod 12. A plurality of additional holes, or channels, 30 are radially arrayed about the central hole 32 and extend completely through the washer 16, from the first face 24 to the second face 26. The base plate 16 is preferably made of metal or some other material which provides the piston 10 with a sufficiently strong base structure.

The polymeric material 18 surrounds the first and second faces 24, 26 of the base plate 16 and extends completely through the holes 30, forming columns 33 of polymeric material 18 through the base plate 16. These columns 33, which extend completely through the base plate 16, are integral with the rest of the polymeric material 18 surrounding the base plate 16, thereby forming a mechanical bond between the polymeric material 18 and the base plate 16.

The piston 10 is preferably formed by injection molding the polymeric material 18 around and through the base plate 16. During the injection molding process, the polymeric material 18 flows through the holes 30 in the base plate 16. The base plate is supported on a shaft (not shown) extending through the central hole 32 during the molding process.

In the preferred embodiment of FIG. 1, the molded piston 10 has a series of radially located stand-offs 34. The stand-offs 34 are on the end surfaces 13, 15 of the piston 10 and contact the cylinder head 36 (FIG. 1). These stand-offs 34 are formed during the molding process. During operation of the piston 10, the stand-offs 34 help absorb the impact that results from the piston 10 striking the cylinder head 36. The flexibility of the polymeric material 18, as compared to a metal or steel alloy, allows for compression and absorption of the impact. The result is lessened noise and vibrations during the operation of the piston-cylinder assembly 8.

The stand-offs 34 of the present invention also allow the working fluid to reach more of the end surfaces 13, 15 of the piston 10. If the piston 10 were flush against the cylinder head 36, greater operating pressures would be needed to actuate the piston 10, because the surface area over which the operating pressure would act would be minimal. The stand-offs 34 prevent the piston 10 from resting flush against the cylinder head 36, thereby maintaining a substantial surface area over which the working fluid can operate. The surface area over which the operating pressure acts is thereby increased, and the likelihood of the piston 10 locking up is decreased.

The present invention also solves the problem of seal degradation common in the prior art. FIG. 1 shows that the molded piston 10 includes integral seals 38. These seals 38 are also formed during the piston molding process. As shown, the seals 38 extend slightly beyond the outside diameter 39 of the piston 10 and provide a seal against the cylinder wall 40 (FIG. 1). In the preferred embodiment, these seals 38 are thin and have sharp edges, so as to minimize friction against the cylinder wall 40, while further providing a flexible seal that can accommodate irregular sealing surfaces. It is possible to obtain these characteristics of seals when they are molded as an integral part of the piston, whereas, when seals are formed separately from the piston and then are installed on the piston, it is difficult to obtain these characteristics.

Polyurethane is a preferred polymeric material 18 for forming the molded piston 10. Polyurethane is more durable and has superior abrasion resisting characteristics than the rubber compounds that are typically used in seals. These properties dramatically improve seal life, especially when contaminants are present in the cylinder 14. Polyurethane also allows for sharp, thin edges to be produced in the injection molding process.

In the second through fourth embodiments of the present invention, shown in FIGS. 5–9, some type of magnetic assembly is incorporated into the molded piston 10 to allow magnetic sensors 42 to detect the location of the piston 10 within the cylinder 14. As shown in FIGS. 5–9, the magnetic material is completely encased in the polymeric material of the molded piston body, so that the magnetic material is not exposed.

Figure 9:
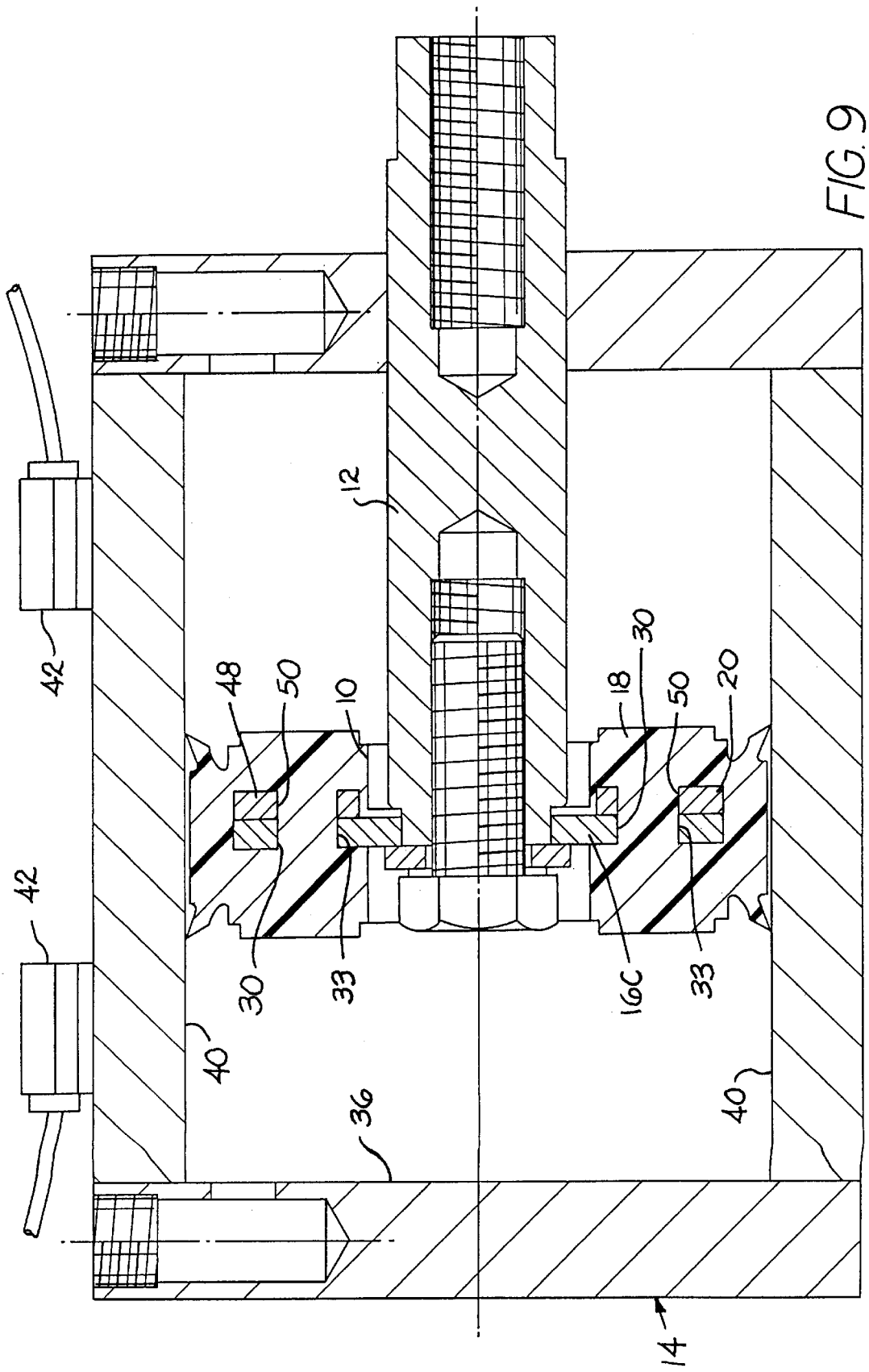
FIG. 9 is a side view of a fourth embodiment of a piston-cylinder arrangement made in accordance with the present invention.

FIGS. 5 and 6 show one such embodiment. In this embodiment, magnets 44 are radially arrayed on the base plate 16A near its outer edge before the polymeric material 18 is molded around the base plate 16A. FIG. 9 shows the sensors 42 mounted on the cylinder 14; these sensors 42 detect the magnetic piston and communicate with a controller (not shown), informing it of the location of the piston.

FIGS. 7 and 8 show another type of magnetic assembly incorporated into the molded piston. In this embodiment, magnets 46 are again arrayed on the base plate 16B before molding the polymeric material 18 around the base plate 16B but, in this case, the magnets 46 are located along the outer circumference rather than on the faces 24, 26 of the base plate 16B.

FIG. 9 is a side sectional view of a piston-cylinder arrangement in which still another mechanism is used to create a magnetic field in the area of the piston. In this case, a magnetic washer 48 lies adjacent to the base plate 16C and is molded into the piston 10 during the molding process. The magnetic washer 48 includes holes 50 aligned with the holes 30 of the base plate 16C so the magnetic washer 48 does not interfere with molding the polymeric material 18 around the base plate 16C and washer 48.

It will be obvious to those skilled in the art that modifications may be made to the embodiments described above without departing from the scope of the present invention.

What is claimed is:

1. A molded piston, comprising:

a washer, having first and second faces and an axis of rotation, and defining a central hole through the washer and a plurality of additional holes surrounding the central hole;

a molded piston body, surrounding the first and second faces of said washer and extending completely through said additional holes, so as to form a mechanical bond between the piston body and the washer;

and further comprising a magnet mounted on said piston so as to create a magnetic field in the area of said piston; wherein said magnet is completely encased in said molded piston body so that the magnetic material is not exposed.

2. A molded piston as recited in claim 1, wherein said molded piston body further includes at least one integral seal for sealing against the body of a cylinder.

3. A molded piston as recited in claim 1, wherein said magnet is formed as a disk, lying adjacent to said washer.

4. A molded piston as recited in claim 1, wherein said magnet is a plurality of magnetic inserts in said washer.

5. A molded piston as recited in claim 4, wherein said magnetic inserts are located in the face of said washer.

6. A molded piston as recited in claim 4, wherein said magnetic inserts are located around the circumference of said washer.

7. A molded piston, comprising:

a washer, having first and second faces and an axis of rotation, and defining a central hole through the washer and a plurality of additional holes surrounding the central hole;

a molded piston body, surrounding the first and second faces of said washer and extending completely through said additional holes, so as to form a mechanical bond between the piston body and the washer;

a magnet formed as a disk, lying adjacent to said washer, and mounted on said piston so as to create a magnetic field in the area of said piston, wherein said magnet is completely encased in said molded piston body so that the magnetic material is not exposed; and wherein said disk includes a second plurality of holes aligned with said plurality of additional holes and wherein polymeric material extends through said second holes and through said additional holes.

8. A piston-cylinder arrangement, comprising:

a cylinder;

a molded piston located inside said cylinder, comprising a disk, having first and second faces and an axis of rotation, and a plurality of holes through said disk;

a molded polymeric piston body, surrounding the first and second faces of said disk and extending completely through said holes, so as to form a mechanical bond between the piston body and the disk; and one or more magnets mounted on said molded piston, completely encased in said polymeric piston body, creating a magnetic field in the area of said piston; and a magnetic sensing device located adjacent to said cylinder to detect the magnetic field when the piston passes a certain point in the cylinder, thereby enabling a controller to pinpoint the location of said piston within said cylinder.

* * * * *